(12) United States Patent
Shirey et al.

(10) Patent No.: US 10,400,906 B2
(45) Date of Patent: Sep. 3, 2019

(54) PIEZO ACTUATOR TYPE VALVE

(71) Applicant: Illinois Tool Works Inc., Glenview, IL (US)

(72) Inventors: Scott E. Shirey, Telford, PA (US); Andrew C. Dymek, Ivyland, PA (US); Sean C. Dunn, Drescher, PA (US); Joseph C. Dille, Telford, PA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/576,567

(22) PCT Filed: Jun. 7, 2016

(86) PCT No.: PCT/US2016/036128
§ 371 (c)(1),
(2) Date: Nov. 22, 2017

(87) PCT Pub. No.: WO2016/209610
PCT Pub. Date: Dec. 29, 2016

(65) Prior Publication Data
US 2018/0163886 A1    Jun. 14, 2018

Related U.S. Application Data

(60) Provisional application No. 62/184,758, filed on Jun. 25, 2015.

(51) Int. Cl.
*F16K 31/02*     (2006.01)
*F16K 31/00*     (2006.01)
(Continued)

(52) U.S. Cl.
CPC .......... *F16K 31/007* (2013.01); *F16K 31/086* (2013.01); *H02N 2/043* (2013.01)

(58) Field of Classification Search
CPC .. F16K 37/0091; F16K 31/007; F16K 31/086; H02N 2/043; G05D 7/0635
(Continued)

(56) References Cited

U.S. PATENT DOCUMENTS 4,695,034 A * 9/1987 Shimizu ................ F16K 31/007
    137/486
4,977,916 A * 12/1990 Ohmi ........................ G01F 1/68
    137/486

(Continued)

FOREIGN PATENT DOCUMENTS

CN          2449011 Y      9/2001
CN        101939577 A      1/2011
(Continued)

OTHER PUBLICATIONS

International Search Report and Written Opinion dated Sep. 9, 2016; International PCT Application No. PCT/US2016/036128.

*Primary Examiner* — Minh Q Le
(74) *Attorney, Agent, or Firm* — McGuireWoods LLP

(57) ABSTRACT

The disclosed embodiments include a valve assembly (300) that includes a piezo stack (308); a piezo actuator (306) encompassing the piezo stack, the piezo actuator having flexural elements (304) that provide a stroke multiplier that amplifies movement of the piezo stack; a valve block (318) having an inlet flow path (320) and an outlet flow path (322); a diaphragm (314) seated atop the valve block, wherein an outer part of the diaphragm is rigid and an inner part of the diaphragm is moveable in a vertical axis; and a bi-lateral flexure (312), wherein a bottom part of the piezo actuator is mechanically attached to the diaphragm via the bi-lateral flexure.

20 Claims, 7 Drawing Sheets

(51) Int. Cl.
*H02N 2/04* (2006.01)
*F16K 31/08* (2006.01)

(58) Field of Classification Search
USPC .............. 137/487.5, 852, 859, 799; 251/331, 251/129.17, 129.19
See application file for complete search history.

(56) References Cited

U.S. PATENT DOCUMENTS

| | | | | |
|---|---|---|---|---|
| 5,251,871 | A * | 10/1993 | Suzuki | F16K 31/025 137/625.33 |
| 6,062,246 | A * | 5/2000 | Tanaka | G05D 7/0635 137/12 |
| 7,205,704 | B2 | 4/2007 | Audren et al. | |
| 2005/0221147 | A1 | 10/2005 | Shioya et al. | |
| 2006/0278276 | A1* | 12/2006 | Tanaka | G01F 1/6847 137/487.5 |
| 2007/0240769 | A1* | 10/2007 | Suzuki | G05D 7/0635 137/487.5 |
| 2010/0127196 | A1* | 5/2010 | Sawada | F16K 7/14 251/129.06 |
| 2010/0294964 | A1* | 11/2010 | Matsumoto | F16K 7/14 251/129.01 |
| 2012/0180876 | A1* | 7/2012 | Hayashi | G01F 1/36 137/486 |
| 2013/0092257 | A1* | 4/2013 | Yasuda | G01F 25/0053 137/487 |
| 2013/0336820 | A1* | 12/2013 | Griffin | H01L 41/053 417/415 |
| 2014/0190578 | A1* | 7/2014 | Hayashi | F16K 31/007 137/486 |
| 2014/0374634 | A1* | 12/2014 | Ohtsuki | G05D 7/0635 251/129.06 |
| 2015/0007897 | A1* | 1/2015 | Valentine | G01F 25/0007 137/487.5 |
| 2016/0033973 | A1* | 2/2016 | Takijiri | G05D 7/0635 137/10 |
| 2016/0349763 | A1* | 12/2016 | Hirose | G05D 7/0635 |
| 2017/0102095 | A1* | 4/2017 | Kunita | F16K 1/12 |
| 2017/0292622 | A1* | 10/2017 | Hayashi | G05D 7/0635 |
| 2018/0003312 | A1* | 1/2018 | Schupp | F16K 31/008 |

FOREIGN PATENT DOCUMENTS

| | | |
|---|---|---|
| CN | 104075006 B | 10/2014 |
| JP | H02163580 A | 6/1990 |
| KR | 20110109520 A | 10/2011 |
| WO | 2014201032 A1 | 12/2014 |
| WO | WO-2014201032 A1 * | 12/2014 ........... F16K 31/007 |

* cited by examiner

PIEZO ACTUATOR TYPE VALVE

CROSS-REFERENCE TO RELATED APPLICATION

This application claims priority to U.S. Provisional Patent Application Ser. No. 62/184,758, filed Jun. 25, 2015, entitled High Flow Piezo Actuator Type Valve, the entire teachings of which are incorporated herein.

BACKGROUND

A mass flow controller (MFC) is a device used to measure and control the flow of liquids and gases. Generally, a MFC is designed and calibrated to control a specific type of liquid or gas at a particular range of flow rates. The MFC can be given a setpoint from 0 to 100% of its full scale range but is typically operated in the 10 to 90% of full scale where the best accuracy is achieved. The device will then control the rate of flow to the given setpoint.

MFCs are used pervasively in the semi-conductor manufacturing to implement product-specific recipes involving different gases required at desired flow-rate set-points. Thus, MFC performance is crucial for overall process yield maximization. An integral part of the mass flow controller is the valve, which regulates, directs or controls the flow of a fluid by opening, closing, or partially obstructing various passageways.

SUMMARY OF THE INVENTION

Disclosed herein are several embodiments of a novel valve design that is intended for both high (>30 slpm) and low flow (≤30 slpm) thermal mass flow controllers. For example, the disclosed embodiments include a valve assembly that includes a piezo stack; a piezo actuator encompassing the piezo stack, the piezo actuator having flexural elements that provide a stroke multiplier that amplifies movement of the piezo stack; a valve block having an inlet flow path and an outlet flow path; a diaphragm seated atop the valve block, wherein an outer part of the diaphragm is rigid and an inner part of the diaphragm is moveable in a vertical axis; and a bi-lateral flexure, wherein a bottom part of the piezo actuator is mechanically attached to the diaphragm via the bi-lateral flexure.

Another disclosed embodiment includes a mass flow controller that includes a flow sensor assembly for sensing flow through a flow path; a valve assembly comprising a piezo stack; a piezo actuator encompassing the piezo stack, the piezo actuator having flexural elements that provide a stroke multiplier that amplifies movement of the piezo stack; a valve block having an inlet flow path and an outlet flow path; a diaphragm seated atop the valve block, wherein an outer part of the diaphragm is rigid and an inner part of the diaphragm is moveable in a vertical axis; and a bi-lateral flexure, wherein a bottom part of the piezo actuator is mechanically attached to the diaphragm via the bi-lateral flexure; and a control device programmed to receive a desired flow rate, receive an indication of flow from the flow sensor assembly, determine an actual flow rate through the flow path, and control the valve assembly to regulate fluid flow.

Non-limiting examples of the various designs for the bi-lateral flexure element and means for connecting the bi-lateral flexure element to the piezo actuator are also described and disclosed herein.

Some of the advantages of the disclosed embodiments include, but not limited to, allowing for improved flow shutoff by implementing an actuator design that can apply an additional shutoff force when driven with a negative voltage; maximizing efficiency of the actuator by eliminating all contact points within the valve, thus eliminating or reducing wear with cycling; and enabling the plunger to be pushed or pulled on.

Additional embodiments, advantages, and novel features are set forth in the detailed description.

BRIEF DESCRIPTION OF THE DRAWINGS

Illustrative embodiments of the present invention are described in detail below with reference to the attached drawing figures, which are incorporated by reference herein and wherein.

Figure 5A:
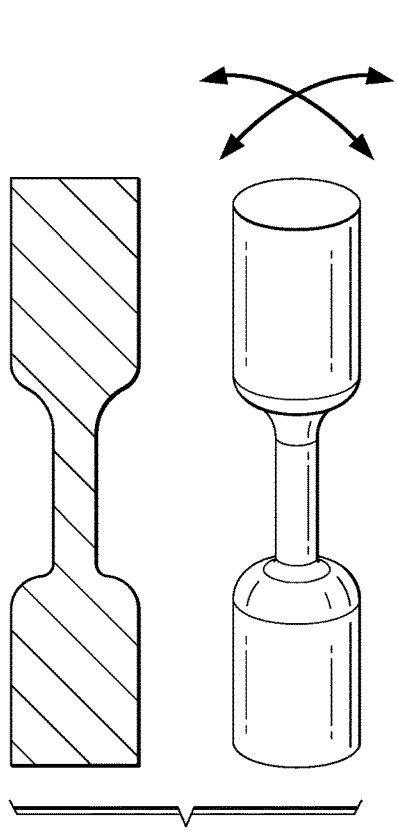
FIG. 5A is a diagram illustrating an example of a bi-lateral flexure design in accordance with the disclosed embodiments.
Figure 5B:
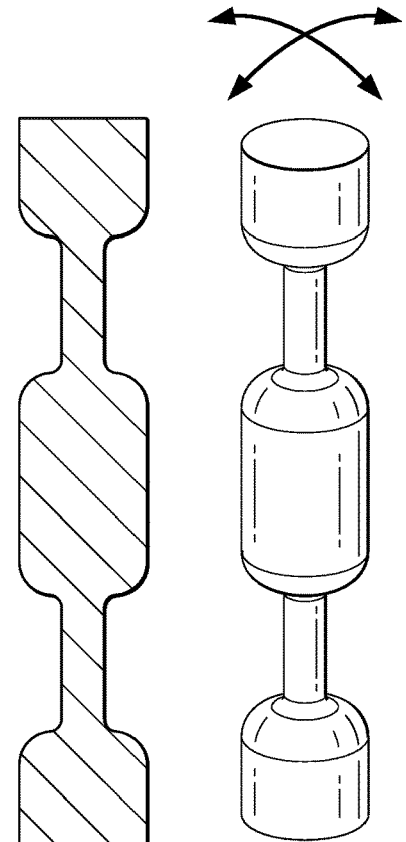
Figure 5C:
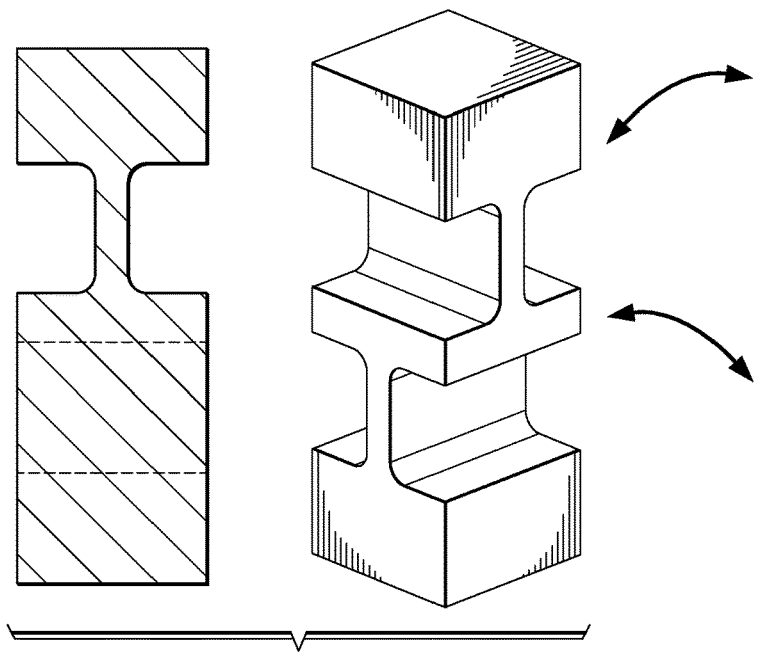
Figure 6:
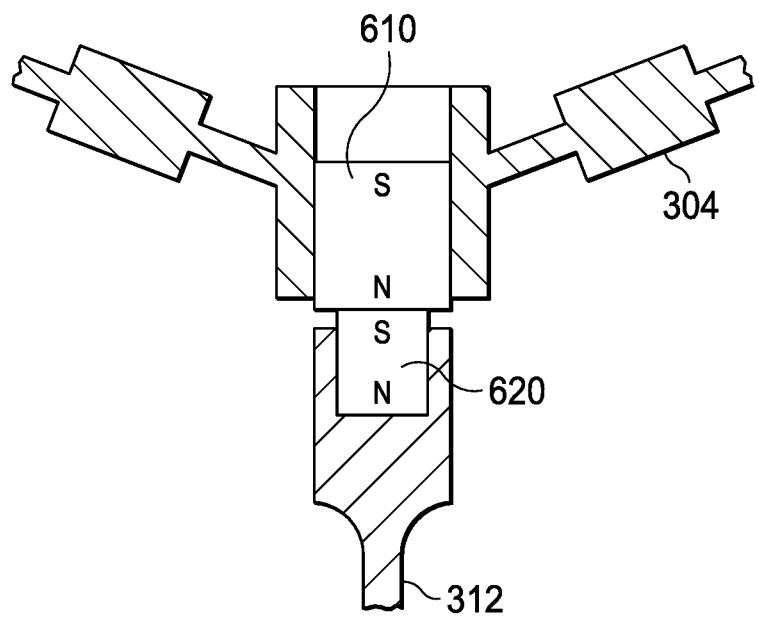
Figure 7:
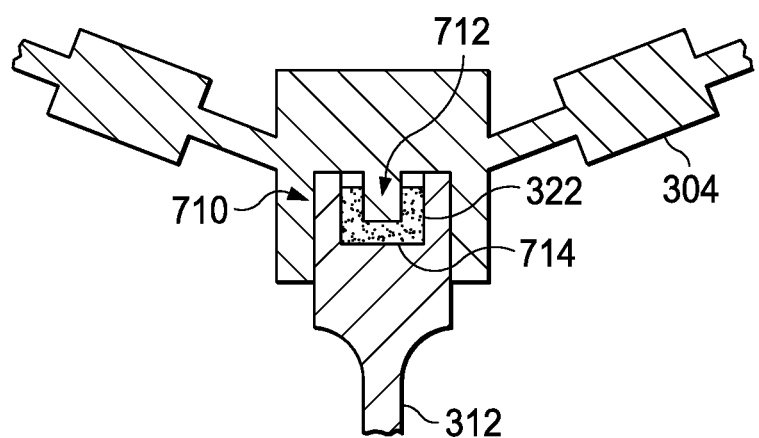
Figure 8:
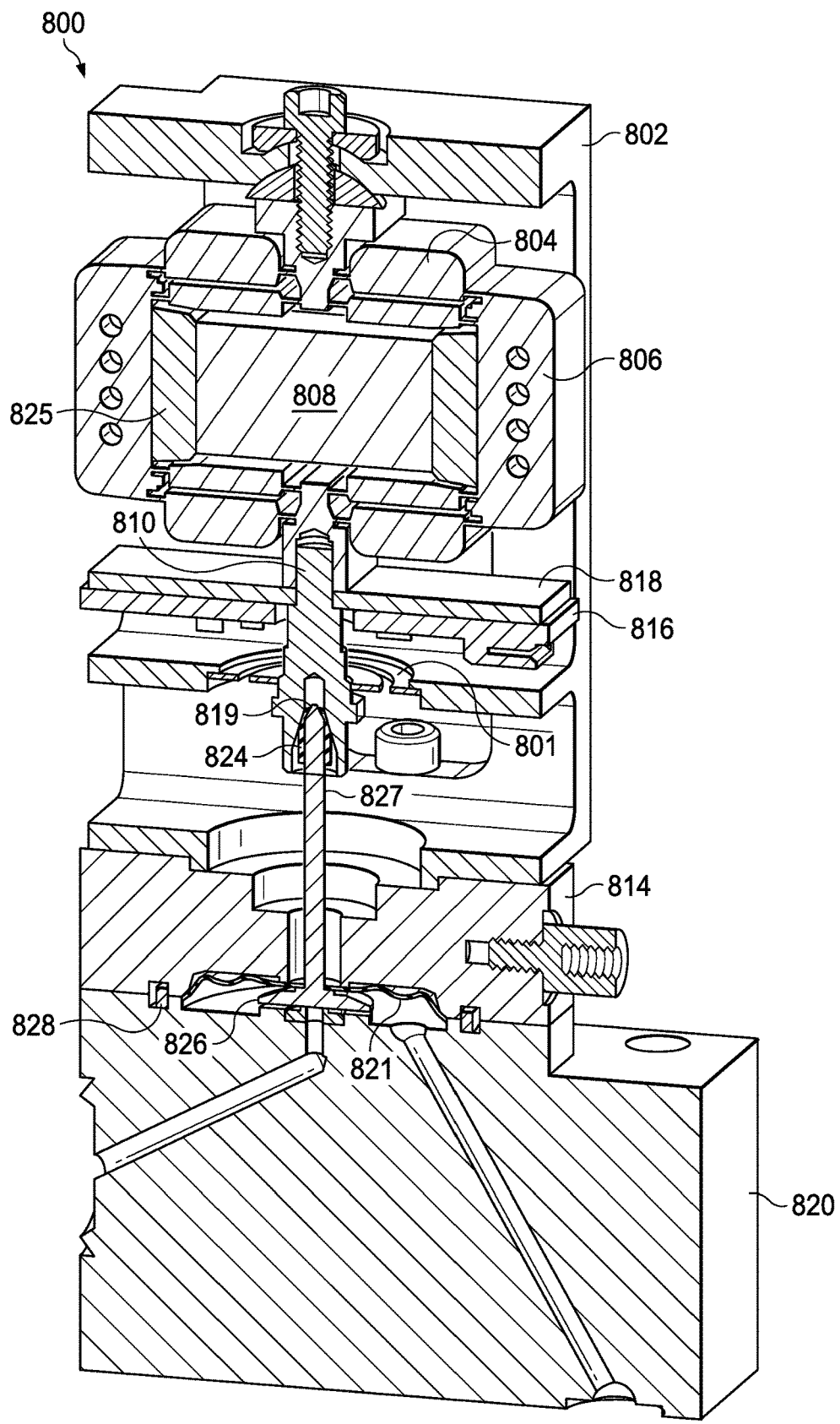

and 5B is a diagram illustrating another example of a bi-lateral flexure design in accordance with the disclosed embodiments;

FIG. 5C is a diagram illustrating an example of a uni-lateral flexure design in accordance with the disclosed embodiments;

FIG. 6 is a diagram illustrating an example of a rigid clamp in accordance with the disclosed embodiments;

FIG. 7 is a diagram illustrating another example of a rigid clamp in accordance with the disclosed embodiments; and FIG. 8 is a diagram illustrating another example of a piezo actuator type valve having a bilateral flexure in accordance with another embodiment.

The illustrated figures are only exemplary and are not intended to assert or imply any limitation with regard to the environment, architecture, design, or process in which different embodiments may be implemented.

DETAILED DESCRIPTION OF THE DRAWINGS

The invention and the various features and advantageous details thereof are explained more fully with reference to the non-limiting embodiments that are illustrated in the accompanying drawings and detailed in the following description. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, descriptions of well-known materials, processing techniques, components, and equipment are omitted so as not to unnecessarily obscure the invention in detail. It should be understood, however, that the detailed description and the specific examples, while indicating particular embodiments of the invention, are given by way of illustration only and not by way of limitation. Further, the illustrated figures are only exemplary and are not intended to assert or imply any limitation with regard to the environment, architecture, design, or process in which different embodiments may be implemented. Various substitutions, modifications, additions, and/or rearrangements within the spirit and/or scope of the underlying inventive concept will become apparent to those skilled in the art from this disclosure.

Other features and advantages of the disclosed embodiments will be or will become apparent to one of ordinary skill in the art upon examination of the following figures and detailed description. It is intended that all such additional features and advantages be included within the scope of the disclosed embodiments.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity. In addition, as used herein, the singular forms "a", "an" and "the" are intended to include the plural forms as well, unless the context clearly indicates otherwise.

Additionally, the term "fluid" is used herein to describe any type of matter in any state capable of flow. The term "gas" is used herein to describe any fluid for which density is substantially dependent on absolute pressure, such as ideal or non-ideal gases, vapors, and supercritical fluids. The term "liquid" is used herein to describe any fluid for which density is not substantially dependent on absolute pressure.

Unless otherwise specified, any use of any form of the terms "connect," "engage," "couple," "attach," or any other term describing an interaction between elements is not meant to limit the interaction to direct interaction between the elements and may also include indirect interaction between the elements described.

Figure 1:
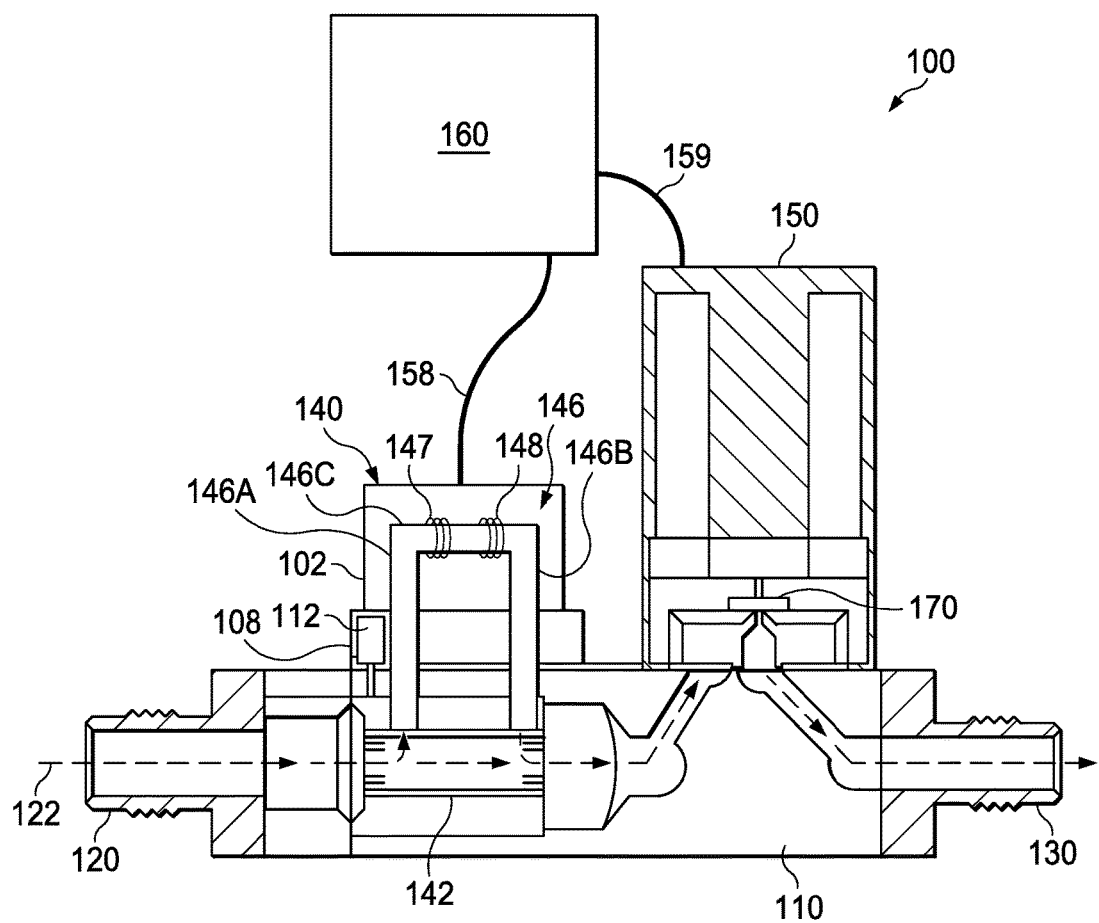
FIG. 1 is a diagram illustrating an example of a mass flow controller in which embodiments of a high and low flow piezo actuator type valve disclosed herein may be incorporated.

FIG. 1 is a schematic diagram of a mass flow controller 100 that includes a block 110, which provides a platform on which the components of the MFC 100 are mounted. In the depicted embodiment, a thermal mass flow meter 140 and a valve assembly 150 containing a valve 170 are mounted on the block 110 between a fluid inlet 120 and a fluid outlet 130. The thermal mass flow meter 140 includes a bypass 142 through which typically a majority of fluid flows and a thermal flow sensor 146 through which a smaller portion of the fluid flows.

Thermal flow sensor 146 is contained within a sensor housing 102 mounted on a mounting plate or base 108. In the depicted embodiment, thermal flow sensor 146 comprises a small diameter tube, typically referred to as a capillary tube, having a sensor inlet portion 146A, a sensor outlet portion 146B, and a sensor measuring portion 146C about which two resistive coils or windings 147 and 148 are disposed. In operation, electrical current is provided to the two resistive windings 147 and 148, which are in thermal contact with the sensor measuring portion 146C. The current in the resistive windings 147 and 148 heats the fluid flowing in measuring portion 146C to a temperature above that of the fluid flowing through the bypass 142. The resistance of windings 147 and 148 varies with temperature. As fluid flows through the sensor conduit, heat is carried from the upstream resistive winding 147 toward the downstream resistive winding 148, with the temperature difference being proportional to the mass flow rate through the sensor.

An electrical signal related to the fluid flow through the thermal flow sensor 146 is derived from the two resistive windings 147 and 148. The electrical signal may be derived in a number of different ways, such as from the difference in the resistance of the resistive windings or from a difference in the amount of energy provided to each resistive winding to maintain each winding at a particular temperature. The electrical signals derived from the resistive windings 147 and 148 after signal processing comprise a sensor output signal. The sensor output signal is correlated to mass flow in the mass flow meter 140 so that the fluid flow can be determined when the electrical signal is measured. The sensor output signal is typically first correlated to the flow in thermal flow sensor 146, which is then correlated to the mass flow in the bypass 142, so that the total flow through the flow meter can be determined and the valve 170 can be controlled accordingly.

The bypass 142 is coupled to the thermal flow sensor 146 and is characterized with a known fluid to determine an appropriate relationship between fluid flowing in the mass flow sensor 146 and the fluid flowing in the bypass 142 at various known flow rates, so that the total flow through the mass flow meter 140 can be determined from the sensor output signal. In certain embodiments, the mass flow controller 100 may not utilize a bypass 142 and the entire flow passes through the thermal flow sensor 146.

In addition, in some embodiments, the mass flow controller 100 may include a pressure transducer 112 coupled to a flow path 122, typically, but not limited to, upstream of the bypass 142 to measure pressure in the flow path 122. Pressure transducer 112 provides an electrical signal indicative of the pressure.

Control electronics 160 control the position of the valve 170 in accordance with a set point indicating the desired mass flow rate, and an electrical flow signal from the thermal flow sensor 146 indicative of the actual mass flow rate of the fluid flowing in the sensor conduit. In one embodiment, traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller 100. A control signal (e.g., a control valve drive signal) is generated based upon an error signal that is the difference between a set point signal indicative of the desired mass flow rate of the fluid and a feedback signal that is related to the actual mass flow rate sensed by the thermal flow sensor 146. The valve 170 is positioned in the fluid flow path 122 (typically downstream of the bypass 142 and the thermal flow sensor 146) and can be controlled (e.g., opened or closed) to vary the mass flow rate of fluid flowing through the main fluid flow path 122, the control being provided by the control electronics 160.

In the illustrated example, the flow rate is supplied by electrical conductors 158 to the control electronics 160 as a voltage signal. The signal is amplified, processed and supplied to the control valve assembly 150 to modify the flow. To this end, the control electronics 160 compares the signal from the mass flow meter 140 to predetermined values and adjusts the valve 170 accordingly to achieve the desired flow.

Figure 2:
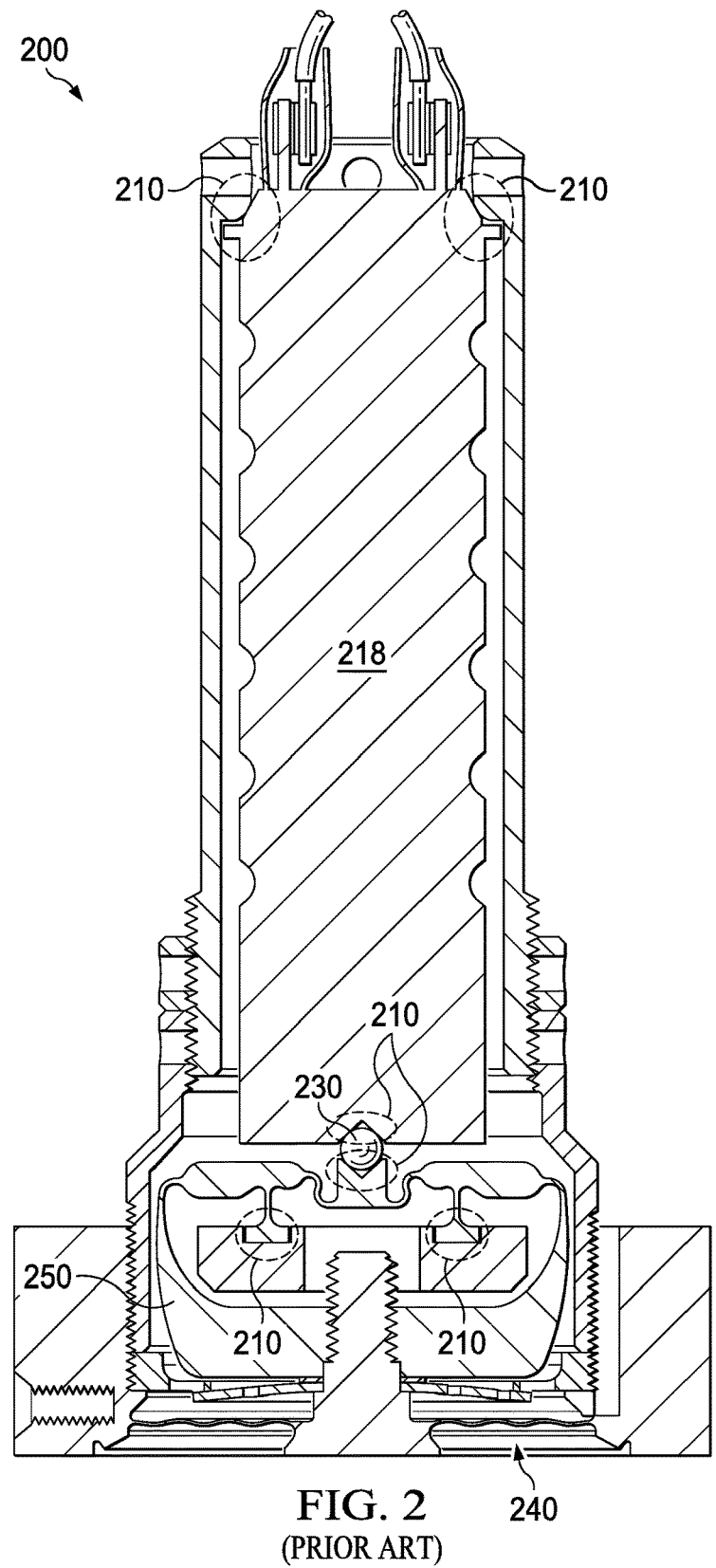
FIG. 2 is a diagram illustrating an example of a piezo actuator type valve in accordance with the prior art.

FIG. 2 is an example of a current valve design 200 that was invented by common inventors of the present application and disclosed in WIPO Pub. No.: WO/2014/201032, which is hereby incorporated within this disclosure in its entirety. The disclosed embodiments improve upon the current valve design 200 by providing an increase in efficiency. For example, a disadvantage found in the current valve design 200 is inefficiency of the stack multiplier 250 to produce the required amount of stroke while still achieving proper valve shutoff. For instance, due to the form factor of the current valve design 200, not all of the energy output from the piezo stack 218 is applied to deflecting the diaphragm seat 240 away from the orifice. One reason for this energy lost is due to the multiple contact points 210 of the valve design 200 (as shown in FIG. 2), as well as the overall efficiency of the multiplier 250. In turn the energy lost equates to a reduced overall valve stroke which limits the maximum flow of the valve. Contact points 210 also introduce friction which results in hysteresis in the valve's flow vs. voltage curve, which is undesirable for precision control. For example, as depicted in FIG. 2, current valve designs include at least 5 contact points 210, three of these are a radial surface on a conical/tapered surface creating a single line contact, and the other two are parallel surfaces creating a surface contact.

Additionally, as shown in FIG. 2, most piezo actuators rely on a rigid ball 230 such as stainless steel ball or sapphire ball to compensate for alignment issues. This limits operation to push only and generally requires a complex design to translate to a normally open valve. In addition, the interface between the rigid ball 230 and the valve will wear as the valve cycles causing a change in the valve stroke characteristics.

Thus, in accordance with the disclosed embodiments, to maximize efficiency of the actuator, all contact points within the valve are removed and where compliance is needed, a bi-axial flexure is used. Additional advantages of the disclosed embodiments include enabling a very clean flow path, the plunger to be pushed or pulled on, and eliminate or reduce the wear with cycling.

Figure 3:
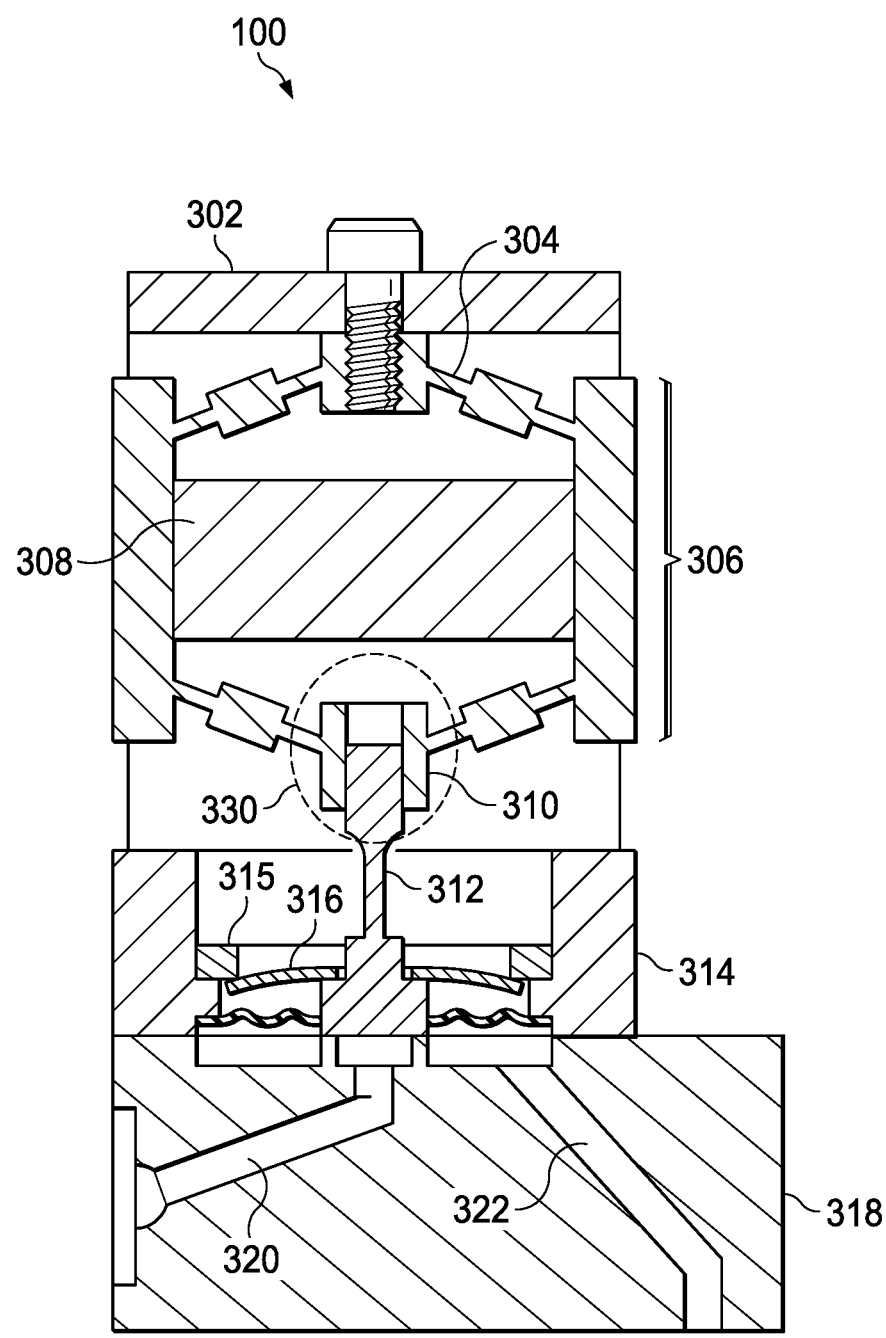
FIG. 3 is a diagram illustrating an example of a piezo actuator type valve having a bilateral flexure in accordance with one embodiment.

FIG. 3 illustrates a valve 300 in accordance with one embodiment. In one embodiment, the valve 300 is integrated in a mass flow controller such as mass flow controller 100 described in FIG. 1. The valve 300 may also be integrated in mass flow controllers having components and configurations differing from that of the mass flow controller 100.

In the depicted embodiment, the valve 300 comprises an actuator frame 302, a flexural element 304, a piezo actuator 306, a piezo stack 308, a rigid clamp 310, a bi-lateral flexure 312, a diaphragm 314, a preload spring 316, and a valve block 318. As shown in the drawing, the outer part of the diaphragm 314 is assumed to be rigid while the inner part moveable in the vertical axis. In one embodiment, the diaphragm 314 is a convoluted or tortuous diaphragm, as opposed to a flat diaphragm. Attached to the outer part of the diaphragm 314 is the actuator frame 302 which rigidly mounts the top part of the piezo actuator 306. The bottom part of the piezo actuator 306 is mechanically attached to the diaphragm 314 stem via (by means of) the bi-lateral flexure 312 which removes all contact points within the valve 300. The bi-lateral flexure 312 is capable of flexing or bending in any direction. As illustrated, the piezo stack 308 is located in between the piezo actuator 306. In the depicted embodiment, the piezo stack 308 is shown in its relaxed state, or its shortest length. As illustrated, in one embodiment, the piezo actuator 306 comprises top and bottom flexural elements 304 that provide a stroke multiplier that amplifies movement of the piezo stack 308. For example, in one embodiment, the piezo actuator 306 is designed such that when the piezo stack 308 expands horizontally, the expansion is magnified via to an amplified vertical movement. By applying a positive voltage to the piezo stack 308, the piezo actuator 306 will vertically shrink and due to the rigid top mount, the diaphragm 314 seat will move away from the valve block 318 orifice allowing a controlled flow of gas from an inlet flow path 320 to an outlet flow path 322. By applying a negative voltage to the piezo stack 308, the piezo actuator 306 will vertically expand allowing an increased diaphragm 314 seat preload beyond that which is applied by the preload spring 316. For instance, in one embodiment, a short term negative voltage can be applied to cancel piezo hysteresis. This hysteresis prevents the piezo stack 308 from returning to its fully relaxed state after a positive voltage is applied. In one embodiment, the mass flow controller is configured to provide (and use) circuitry to drain charge from the piezo stack 308 when driving in the closing direction. This circuitry is still active while the piezo stack 308 is "OFF" thus keeping any electrical charge (produced by stray mechanical energy) from building on the piezo stack 308 to prevent the valve 300 from creeping open.

In the depicted embodiment, the preload spring 316 is held in place by a preload spring clamp 315. In one embodiment, in order to achieve a proper interface between the diaphragm 314 seat and the valve block 318 orifice, there needs to be compliance built into the interface between the piezo actuator 306 and the diaphragm 314 seat to remove any non-axial forces due to manufacturing tolerances and assembly. This criteria is met via a bi-lateral flexure 312 built in between the bottom of the piezo actuator 306 and the diaphragm 314 seat to allow non-axial deflections while still providing a rigid axial connection between the piezo actuator 306 and the diaphragm 314 seat. This arrangement maintains mechanical efficiency while allowing for manufacturing tolerances. In one embodiment, the bi-lateral flexure 312 is connected to the flexural elements 304 using a rigid clamp 310.

Thus, the disclosed embodiments provide an advantage over the current state of the art by implementing a completely different piezo actuator form factor that allows for much higher valve stroke efficiency and no stroke losses due to contact points. This improved efficiency correlates directly to higher valve strokes which allow for greater flows using an orifice of practical size. By removing all of the internal valve contact points from the design, the disclosed valve in turn can achieve a much higher shutoff force which reduces the valve leakby.

In addition, as stated above, current valve designs typically use a ball between the piezo actuator and valve body to compensate for misalignment. This limits the actuator to applying force in only one direction (compression of the ball interface). In contrast, the disclosed embodiments utilize a rigid clamp combined with a bi-lateral flexure that enables the piezo actuator to apply additional shut-off force when a negative voltage is applied to the piezo stack.

Figure 4:
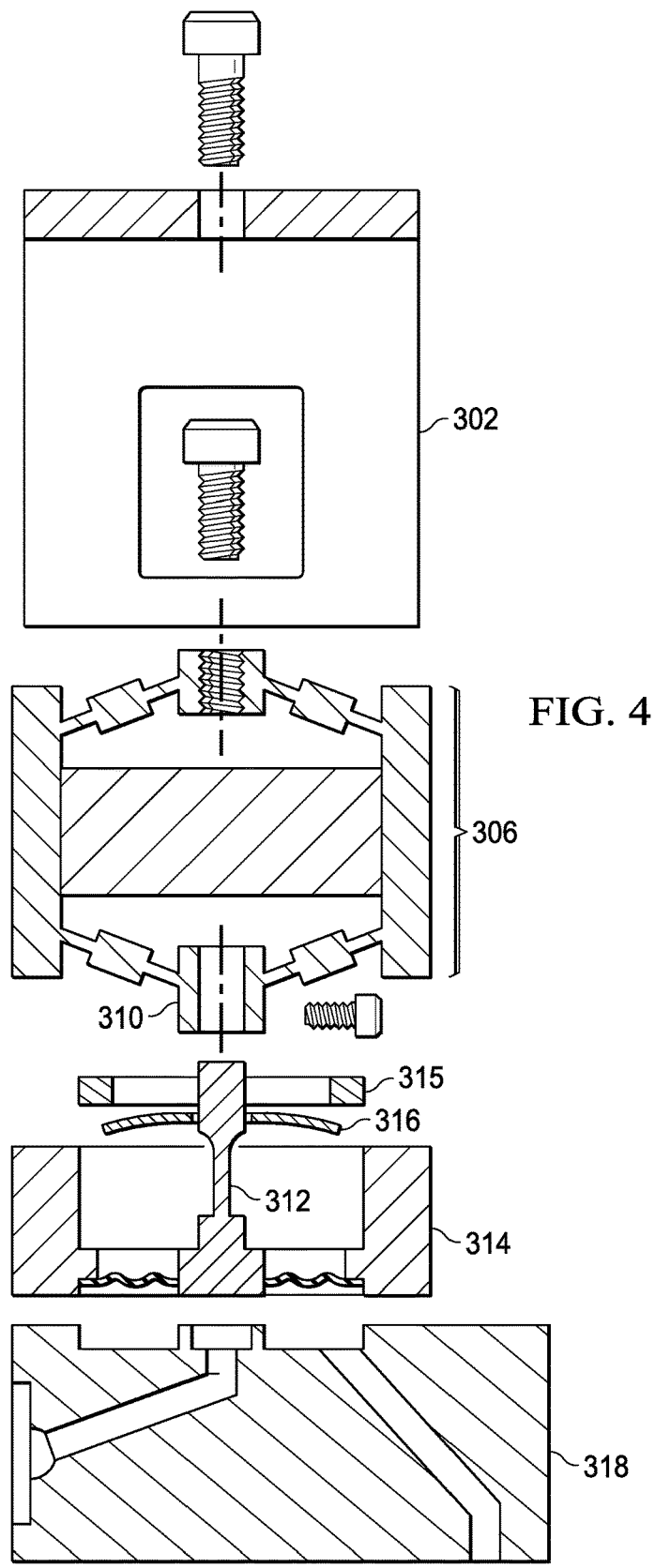
FIG. 4 is a diagram illustrating an example of an exploded view of the piezo actuator type valve shown in FIG. 3.

FIG. 4 illustrates the exploded view of the valve 300 in accordance with an embodiment. In this embodiment, the actuator frame 302 is bolted to the diaphragm 314 and then to the top of the piezo actuator 306. The bottom of the piezo actuator 306 uses a rigid clamp 310 which could be in the form of a clamp collar, multi jaw chuck, locking set screw, etc. to mount to the diaphragm 314 stem. These features remove the contact points from the entire valve.

FIGS. 5A and 5B illustrate a couple of examples of bi-lateral flexure designs in accordance with the disclosed embodiments. As depicted in the diagrams, the bi-lateral flexure designs are capable of bending or flexing in any direction. In one embodiment, the flexure is made out of 316L stainless steel (SS). However, in other embodiments, the flexure could be Hastelloy or any other type of corrosion resistant alloy. As depicted in FIG. 5A, in one embodiment, the bi-lateral flexure comprises two wide elongated cylindrical sections connected by a narrow shaft or coupling. The length and width of the two wide elongated cylindrical sections and the narrow coupling may vary in different embodiments. Additionally, although the two end cylindrical sections are depicted as being the same length and width with, in some embodiments, the two end cylindrical sections may vary in length and/or width.

FIG. 5B depicts a bi-lateral flexure comprising two end cylindrical sections and a middle cylindrical section. The middle cylindrical section is connected on each end to each of the end cylindrical sections via a narrow coupling/shaft section. The length and width of each of the sections and the connector sections may vary in different embodiments. For example, in some embodiments, the middle cylindrical section may be wider than the two end cylindrical sections. Further, the two end cylindrical sections may vary in size from each other. Still, in certain embodiments, the bi-lateral flexure may comprise a base portion having a different size and shape than that of the top portion of the bi-lateral flexure as depicted in the embodiments illustrated in FIGS. 3 and 4.

In alternative embodiments, a uni-lateral flexure such as the example shown in FIG. 5C may be used in accordance with the disclosed embodiments. In the depicted embodiment, the uni-lateral flexure design is comprise of two I-beam shaped structures that are mounted perpendicular and vertically to each, such that they share a common middle platform. As shown in the diagram, this uni-lateral flexure enables flexing in both the X or Y directions.

FIGS. 6 and 7 illustrate two variations on the "Rigid Clamp" as illustrated in FIG. 3. These variations would replace the coupling portion 330 as shown indicated in FIG. 3. In the embodiment illustrated in FIG. 6, a magnetic version of the coupling is disclosed where the clamp is replaced with a magnetic coupling using an actuator magnet 610 and a coupling magnet 620. The magnetic coupling allows lateral misalignment during the assembly process, but gives a rigid connection once the magnets touch. For instance, when the magnets couple, they will provide a rigid joint without the problems associated with a contact point. The flat surfaces of the magnets will accommodate any lateral misalignment between the actuator and the body.

In the embodiment illustrated in FIG. 7, instead of using a clamp to attach the flexure to the actuator, in this embodiment, a glued joint or glued connection 710 where a pin 712 and cup 714 are used to facilitate the glued connection 710. In one embodiment, the glue would be a hard adhesive like an epoxy. The glued joint would accommodate a significant lateral and vertical misalignment. For instance, in one embodiment, the glue would allow the parts to be positioned independently allowing for vertical and lateral misalignment while still eliminating a contact point.

FIG. 8 illustrates a three dimension view of a valve 800 in accordance with another embodiment. In one embodiment, the valve 800 is implemented in a mass flow controller as described above. Similar to the valve in FIG. 3, the valve 800 comprises an actuator frame 802, a piezo actuator 806 comprising a top and bottom flexural elements 804 and a piezo stack 808 (may be more than one), thermal compensation blocks 825, a coupler 810, a coupler sleeve 824, a plunger seat 826, a bi-lateral flexure 827, a valve base 814, a diaphragm 821, a concentricity control ring 828, a lateral locator spring 801, a spherical mount 823, a position sensor target 818, a position sensor 816, and a valve block 820. In this embodiment, the coupler 810 and tapered sleeve 824 combine to attach the bottom part of the piezo actuator 806 to the plunger seat 826 via the bi-lateral flexure 827 which removes all contact points within the valve 800. In one embodiment, the plunger seat 826 and the bi-lateral flexure 827 are machined as one part. Alternatively, the plunger seat 826 and the bi-lateral flexure 827 may be separate components that are welded or glued together. In one embodiment, a top portion 819 of the bi-lateral flexure 827 is wider than the body the bi-lateral flexure 827 for providing a secure connection to the coupler 810 using the tapered sleeve 824.

The spherical mount 823 and lateral locator spring 801 combine to provide axial and concentricity alignment of the piezo actuator 806 with the valve base 814 which in turn is axially and centrically aligned with the valve body 820 via the concentricity control ring 828. The lateral locator spring 801 can be configured to provide either actuation force or preload force depending on the application requirements.

To enable the valve to operate over a wide temperature range without losing valve shut-off or overstressing the bi-lateral flexure stem, the valve must be constructed so as to produce near zero stroke change over the operating temperature range. In one embodiment, the sum of all of the thermal expansions can be nulled out by selecting materials with appropriate coefficients of thermal expansion (CTE) for the actuator frame, the actuator flexure 804, the coupler 810, and the valve base 814. For example, in one embodiment, the actuator frame 800 has a high CTE, the actuator flexure 804 has a low CTE, the thermal compensation blocks have a high CTE, and the coupler has a low CTE.

The valve base 814 and valve body 820 are sealed by sandwiching the diaphragm 821 between a bead feature of the valve body 820 and a sealing land of the valve base 814. This provides clean, reliable, all-metal sealing without the use of a separate sealing component.

The valve position can accurately be determined by the use of a capacitor based electronic sensing system comprised of a metal target plate 818 and a sensor 816 with integral capacitor plate and on-board electronics. The target plate can be a separate component as shown, or as an integral feature of the actuator flexure 804. In one embodiment, the target 818 moves with the actuator and the sensor 816 are fixed to the non-moving valve assembly. In the depicted embodiment, the target 818 is attached to the actuator frame 802. Appropriate signals are imposed on the capacitor and the resulting output is proportional to the gap between the plates which is governed by the valve position. Other aspects and configuration of the valve 800 is as described above with respect to the valve 300.

Accordingly, the above description discloses several embodiments of a novel valve design that is intended for both high (>30 slpm) and low flow (≤30 slpm) thermal mass flow controllers. As described herein, the disclosed valve utilizes a piezo stack for controlling flow by deflecting a diaphragm upwards from its sealed seated position over an orifice of known diameter in a controlled fashion. The maximum flow possible through the valve for a given set of fluid conditions is governed by the diameter of the orifice and the maximum displacement of the diaphragm. Due to its inherent limitations, a piezo stack can generate a large force but with a small displacement. For example, a typical 2.5" long piezo actuator has a maximum displacement of only about 0.0022". This is not adequate displacement to allow the desired amount of flow using an orifice of practical size. Thus, in accordance with the disclosed embodiments, in order to develop high flows within the valve, a stroke multiplier can be added to the design to amplify the inherently small motion of the piezo stack at the expense of force. The piezo stack can be integrated with stroke multiplier to become an actuator. To maximize efficiency of the actuator, all contact points within the valve are removed and where compliance is needed, a bi-axial flexure is used. In one embodiment, a unique aspect of the disclosed embodiments is the combination of a rigid clamp and bi-lateral flexure with a piezo actuator.

Advantages of the disclosed embodiments include, but not limited to, 1) allowing for improved flow shutoff by implementing an actuator design that can apply an additional shutoff force when driven with a negative voltage; 2) maximizing efficiency of the actuator by eliminating all contact points within the valve, thus eliminating or reducing wear with cycling; 3) using bi-axial flexure instead of a ball, thus, enabling the plunger to be pushed or pulled on; and 4) providing a very clean flow path.

As previously stated, the above description including the diagrams are intended merely as examples of the disclosed embodiments and is not intended to limit the structure, process, or implementation of the disclosed embodiments. As understood by one of ordinary skill in this art that certain aspects of the disclosed embodiments described herein may be implemented as firmware, firmware/software combination, firmware/hardware combination, or a hardware/firmware/software combination.

It is further understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

We claim:

1. A valve assembly comprising:
    a piezo stack;
        a piezo actuator encompassing the piezo stack, the piezo actuator having flexural elements that provide a stroke multiplier that amplifies movement of the piezo stack;
        a valve block having an inlet flow path and an outlet flow path;
        a diaphragm seated atop the valve block, wherein an outer part of the diaphragm is rigid and an inner part of the diaphragm is moveable in a vertical axis; and
        a bi-lateral flexure capable of flexing or bending to allow non-axial deflections while providing an axial connection between the piezo actuator and the diaphragm inner part, wherein a bottom part of the piezo actuator is mechanically attached to the diaphragm via the bi-lateral flexure.

2. The valve assembly according to claim 1, further comprising an actuator frame coupled to the outer part of the diaphragm.

3. The valve assembly according to claim 2, wherein the actuator frame mounts to a top part of the piezo actuator.

4. The valve assembly of claim 1, wherein the bottom part of the piezo actuator is attached to the bi-lateral flexure using a rigid clamp.

5. The valve assembly of claim 1, wherein the bottom part of the piezo actuator is attached to the bi-lateral flexure using magnetic coupling comprising an actuator magnet and a coupling magnet.

6. The valve assembly of claim 1, wherein the bottom part of the piezo actuator is attached to the bi-lateral flexure using a glued connection.

7. The valve assembly of claim 6, wherein the glued connection is facilitated by a pin-shape component of the piezo actuator and a cup-shape component of the bi-lateral flexure.

8. The valve assembly of claim 1, further comprising a preload spring positioned around the bi-lateral flexure within the diaphragm.

9. A mass flow controller comprising:
    a flow sensor assembly for sensing flow through a flow path;
    a valve assembly comprising a piezo stack;
    a piezo actuator encompassing the piezo stack, the piezo actuator having flexural elements that provide a stroke multiplier that amplifies movement of the piezo stack;
    a valve block having an inlet flow path and an outlet flow path;
    a diaphragm seated atop the valve block, wherein an outer part of the diaphragm is rigid and an inner part of the diaphragm is moveable in a vertical axis; and
    a bi-lateral flexure capable of flexing or bending to allow non-axial deflections while providing an axial connection between the piezo actuator and the diaphragm inner part, wherein a bottom part of the piezo actuator is mechanically attached to the diaphragm via the bi-lateral flexure; and
    a control device programmed to receive a desired flow rate, receive an indication of flow from the flow sensor assembly, determine an actual flow rate through the flow path, and control the valve assembly to regulate fluid flow.

10. The mass flow controller of claim 9, wherein the valve assembly further comprises an actuator frame coupled to the outer part of the diaphragm.

11. The mass flow controller of claim 10, wherein the actuator frame mounts to a top part of the piezo actuator.

12. The mass flow controller of claim 9, wherein the wherein the bottom part of the piezo actuator is attached to the bi-lateral flexure using a rigid clamp.

13. The mass flow controller of claim 9, wherein the bottom part of the piezo actuator is attached to the bi-lateral flexure using magnetic coupling comprising an actuator magnet and a coupling magnet.

14. The mass flow controller of claim 9, wherein the bottom part of the piezo actuator is attached to the bi-lateral flexure using a glued connection.

15. The mass flow controller of claim 14, wherein the glued connection is facilitated by a pin-shape component of the piezo actuator and a cup-shape component of the bi-lateral flexure.

16. The mass flow controller of claim 9, wherein the valve assembly further comprises a preload spring positioned around the bi-lateral flexure within the diaphragm.

17. The mass flow controller of claim 9, further comprising circuitry to drain charge from the piezo stack when driving in a closing direction.

18. The mass flow controller of claim 9, wherein the bi-lateral flexure comprises a wide base portion and a top portion connected by a narrow shaft.

19. The mass flow controller of claim 9, wherein the bi-lateral flexure is an elongated tubular stem attached to a plunger seat.

20. The mass flow controller of claim 9, wherein the control device is configured to apply a negative voltage to the piezo stack to cancel piezo hysteresis.

* * * * *